United States Patent [19]

Colley

[11] Patent Number: 5,769,556

[45] Date of Patent: Jun. 23, 1998

[54] BICYCLE CLAMP

[75] Inventor: Scott A. Colley, Fort Wayne, Ind.

[73] Assignee: Universal Consolidated Methods, Inc., Topeka, Ind.

[21] Appl. No.: 758,909

[22] Filed: Dec. 2, 1996

[51] Int. Cl.$^6$ ........................................................ F16B 7/04
[52] U.S. Cl. .............................. 403/24; 403/396; 403/391; 24/335; 24/569; 248/68.1
[58] Field of Search ...................... 403/396, 389, 403/391, 390, 384, 385, DIG. 9, 24; 24/335, 369, 339; 248/68.1

[56] References Cited

U.S. PATENT DOCUMENTS

| 2,355,742 | 8/1944 | Morehouse | 248/68.1 |
|---|---|---|---|
| 2,795,770 | 6/1957 | Toedtman | 403/391 X |
| 2,803,349 | 8/1957 | Talbot | 24/569 X |
| 3,397,431 | 8/1968 | Walker | 248/68.1 X |
| 3,531,071 | 9/1970 | Kubli | 403/391 X |
| 3,604,687 | 9/1971 | Moore | 403/391 X |
| 4,273,465 | 6/1981 | Schoen | 403/391 |
| 4,821,382 | 4/1989 | Puscykarski | 24/339 X |
| 5,172,877 | 12/1992 | Hattori et al. | 24/569 X |

FOREIGN PATENT DOCUMENTS

| 1099326 | 9/1955 | France | 248/68.1 |
|---|---|---|---|
| 1451964 | 9/1966 | France | 24/339 |
| 247739 | 7/1969 | U.S.S.R. | 248/68.1 |
| 2029490 | 3/1980 | United Kingdom | 403/396 |

Primary Examiner—Harry C. Kim
Attorney, Agent, or Firm—Roger M. Rickert

[57] ABSTRACT

A clamp for supporting a bicycle is formed of two like halves joined by a single central bolt. The clamp halves are urged apart by a single central spring surrounding the bolt. Each half of the clamp has a pair of concave cylindrical segments, one for receiving a tubular member of a bicycle and the other for receiving a tubular portion of a bicycle support rack. Each cylindrical segment is lined with a resilient protective material to prevent damage to the bicycle frame as well as to insure a firm grip on the tubular members and allow the clamp to accommodate a range of tubular diameters.

4 Claims, 1 Drawing Sheet

BICYCLE CLAMP

SUMMARY OF THE INVENTION

The present invention relates generally to clamping devices and more particularly to a clamp for joining two tubular members. In the preferred form, the clamp is adapted to join a tubular portion of a bicycle to another tubular member to facilitate transportation, storage or maintenance of the bicycle.

While ideally suited for riding, bicycles are cumbersome and difficult to store or transport. Peddles and handlebars extending laterally make it difficult to lay a bicycle on its side. Some transportation techniques locate the bicycle longitudinally on top of an automobile and frequently involve removal of one or more bicycle wheels. Others support the bicycle transversely behind the vehicle on a bracket which clamps to the vehicle rear bumper or outside mounted spare tire, or is supported by a vehicle trailer hitch. These rear mounted bike carriers may simply cradle the upper horizontal tubular portion of the bicycle frame (requiring additional tie-down straps or elastic BUNJI cords), or may secure that frame portion using a large padded 3 or 4 bike clamping arrangement. In either case, the upper horizontal tubular portion mounted bicycle tends to sway with vehicle accelerations and decelerations. The drawbacks of these rear mount arrangements are further indicated by the offering of "girls bike adapters" and "anti-rattle collars" as accessories.

Among the several objects of the present invention may be noted the avoidance of the above noted drawbacks of conventional bicycle carriers, the provision of a simplistic padded clamp suitable for joining a pair of tubular members generally parallel to one another; and the provision of an improved clamp for supporting a bicycle. These as well as other objects and advantageous features of the present invention will be in part apparent and in part pointed out hereinafter.

In general, a clamp for joining a first tubular member such as a bicycle frame member to a second tubular member such as a tubular portion of a bicycle support rack has a pair of clamp halves each of uniform cross-sectional configuration and each including first and second concave (typically cylindrical) regions for receiving corresponding cylindrical portions of the first and second tubular members respectively. There is a resilient pad arrangement lining the first and second concave regions of each of the clamp halves for engaging corresponding cylindrical portions of the first and second tubular members when the first and second tubular members are joined by the clamp. A threaded fastener passes through one of the clamp halves intermediate the first and second concave regions and threadedly into the other clamp half for selectively drawing the clamp halves toward one another and the pad into engagement with the corresponding cylindrical portions of the first and second tubular members. A spring may be disposed intermediate the clamp halves surrounding a portion of the threaded fastener to bias or urge the clamp halves away from one another so as to release the tubular members when the drawing force of the threaded fastener is removed. Such a spring also facilitates initial application of the clamp to the tubular members by holding the clamp halves apart while they are being positioned about the tubular members.

Also in general, and in one form of the invention, the manufacture of a bicycle support clamp for clamping a tubular portion of a bicycle frame to a tubular support member is accomplished by forming an extruded bar of uniform cross-sectional configuration having two concave generally cylindrical segments extending in the direction of elongation and generally parallel to one another. This bar is cut along a series of lines perpendicular to the direction of elongation to form a set of substantially identical clamp halves. The segments of each of a pair of clamp halves is lined with a protective material. This lining may take place either before or after slicing the bar into clamp halves. In either case, the pair of clamp halves may then be aligned with their respective lined cylindrical segments facing one another to form therebetween a pair of cylindrical spaces for receiving the bicycle frame tubular portion and tubular support member respectively. The clamp halves are typically joined by a bolt passing through one half and into threaded engagement with the other. The bolt is tightened to securely clamp the tubes together.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
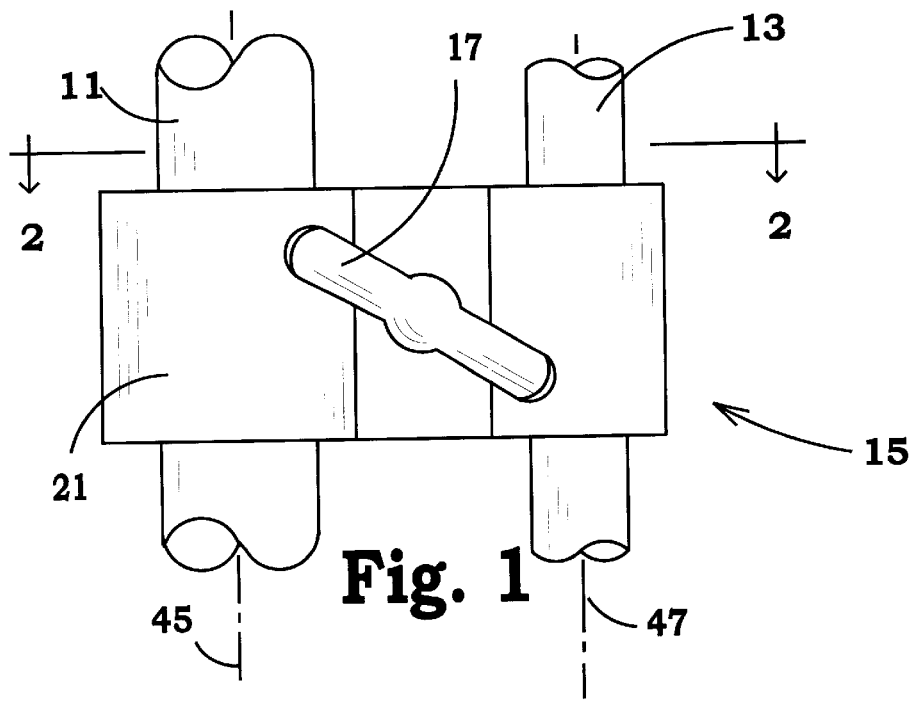
FIG. 1 is a side elevation view of a padded clamp joining a pair of tubular members.
Figure 2:
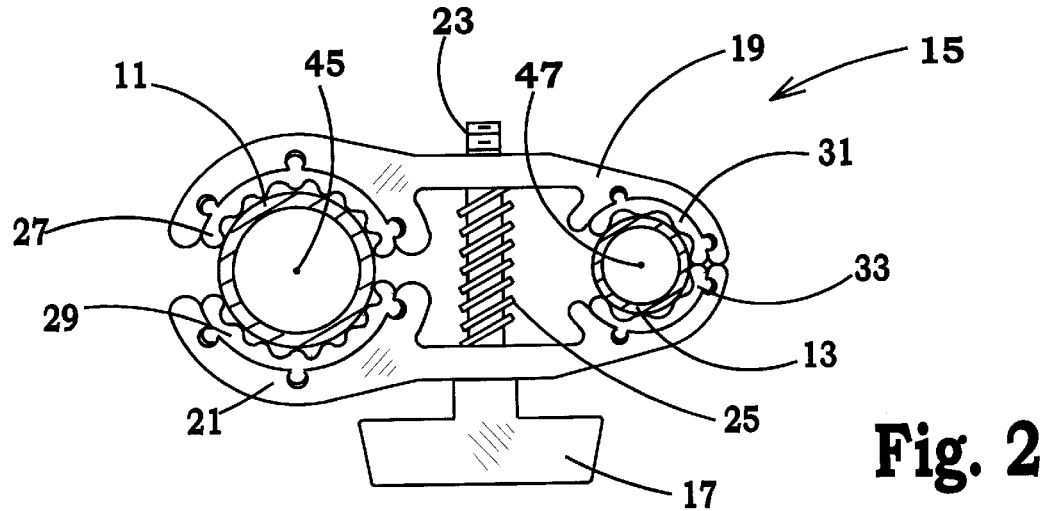
FIG. 2 is a cross-sectional view along the lines 2—2 of FIG. 1.

In FIGS. 1 and 2, the clamp 15 is seen joining tubular member 13 which comprises a portion of a bicycle frame and tubular member 11 which comprises an upright portion of a bicycle support rack. The clamp 15 is formed of two clamp halves 19 and 21 each of uniform cross-sectional configuration and each including first 43 and second 37 concave regions for receiving corresponding cylindrical portions of the first and second tubular members. Resilient pads 27, 29, 31 and 33 line the first and second concave regions of each of the first and second clamp halves for engaging and gripping corresponding cylindrical portions of the first and second tubular members when those tubular members are joined by the clamp. Preferably, these pads have a non-slip surface to aid in holding the tubes securly in their clamped postions.

A threaded fastener such as the bolt 23 having a knob 17 fixed thereto passes transversely through the clamp half 21 intermediate the two concave regions and threads into the other clamp half 19. As the knob 17 is tightened, the clamp halves are drawn toward one another and the pads securely engage the corresponding cylindrical portions of the tubular members 11 and 13. A spring 25 is located between the clamp halves 19 and 21 and surrounds the central portion of the bolt 23 and functions to urge the clamp halves away from one another to release the tubular members when the drawing force of the threaded fastener is removed.

As seen by comparing FIGS. 1 and 2, the first and second tubular members are cylindrical and each has an axis 45 or 47 which extends generally parallel to the axis of the other when the first and second tubular members are joined by the clamp. The first and second clamp halves are of uniform cross-sectional configuration in planes orthogonal to the tubular axes.

Figure 3:
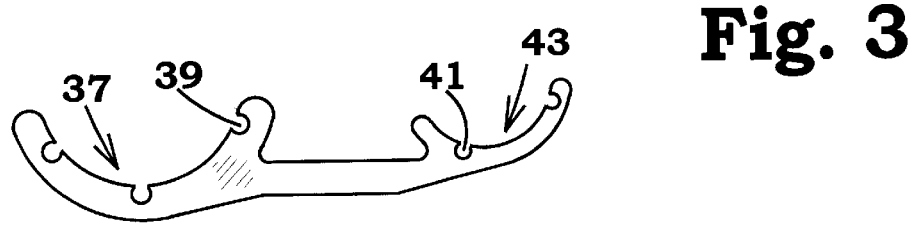
FIG. 3 is an end view of the extruded bar from which both clamp halves are sliced.

As seen by comparing FIGS. 2 and 3, the first 43 and second 37 concave regions of each of the clamp halves each include a plurality of elongated grooves such as 39 and 41 extending generally parallel to the tubular member axes and the resilient pads, which are rubber-like arcuate segments, are provided with a fluted inner surface having a plurality of ridges for engaging corresponding elongated grooves to hold the resilient pads in position within their respective concave regions.

The method of manufacture of the clamp of FIGS. 1 and 2 may be accomplished in a variety of ways, however, the symmetry of the two clamp halves allows unique and efficient fabrication techniques. An extruded aluminum bar, an end view of which is shown in FIG. 3, has a uniform cross-sectional configuration and may be sliced along lines perpendicular to its direction of elongation to form a set of clamp halves such as 19 and 21. The protective linings 27, 29, 31 and 33 may be placed in the grooves prior to slicing as by coating those portions of the bar, or may be individually inserted in the four concavities after slicing. One clamp half 21 is drilled transversely while the other 19 is drilled with a smaller bit and tapped to receive the bolt 23. Spring 25 is passed over the bolt 23 prior to joining the clamp halves.

The four rubber-like arcuate segments 27, 29, 31 and 33 are preferably sufficiently thick and resilient to accommodate a range of bicycle (tube 13) and support (tube 11) sizes. In one preferred form, the clamp accommodated a bicycle frame tube up to 1½ inches in diameter and a support tube ranging from 1½ to 2¼ inches in diameter. The protective segments may be made of natural or synthetic rubber, or other suitable resilient material. If desired, a more rigid protective coating may be applied to the concavities either before or after slicing the bar into clamping halves.

The method of operation of the invention should now be clear. The tubular member 11 is supported in an upright position on a vehicle as by clamping to the rear bumper, upstanding from a trailer hitch, by a clamp to a spare tire mount or other conventional technique. Knob 17 is loosened, if necessary, and the clamp halves 19 and 21 allowed to spread to a tube accepting position under the urging of spring 25. The bicycle is then hoisted and the main vertical bicycle frame tube 13 is brought into close proximity to, and aligned generally parallel with, tube 11. The clamp halves are positioned about the tubes and knob 17 is tightened until both tubes are securely gripped by the clamp. Use of the clamp for other than transportation, for example, for supporting a bicycle while a wheel is removed, is accomplished in an analogous manner. Other applications will readily suggest themselves.

From the foregoing, it is now apparent that a novel bicycle clamping arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. In combination with a first cylindrical tubular member comprising a portion of a bicycle frame and a second cylindrical tubular member comprising an upright portion of a bicycle support rack, a bicycle support clamp for joining the first tubular member to the second tubular member with a longitudinal axis of one of said tubular members extending generally parallel to a longitudinal axis of the other tubular member when the first and second tubular members are joined by the clamp, the clamp comprising:

first and second clamp halves each of substantially the same uniform cross-sectional configuration in all planes orthogonal to the longitudinal axes and each of the halves including first and second concave regions for receiving corresponding cylindrical portions of the first and second tubular members respectively;

resilient pad means comprising four rubber-like arcuate segments each lining a corresponding one of the first and second concave regions of each of the first and second clamp halves for engaging the corresponding cylindrical portions of the first and second tubular members when the first and second tubular members are joined by the clamp;

a threaded fastener passing through one of the clamp halves intermediate the first and second concave regions and into the other clamp half for selectively drawing the clamp halves toward one another and the pad means into engagement with the corresponding cylindrical portions of the first and second tubular members.

2. The combination clamp of claim 1 further including a spring disposed intermediate the first and second clamp halves surrounding a portion of the threaded fastener for urging the clamp halves away from one another to release the tubular members when the drawing force of the threaded fastener is removed.

3. The combination of claim 1 wherein the first and second concave regions of each of the clamp halves each include a plurality of elongated grooves extending generally parallel to the axes, and the resilient pad means include a plurality of ridges for engaging corresponding elongated grooves to hold the resilient pad means in position within the first and second concave regions of the first and second clamp halves.

4. The combination of claim 3 wherein the four rubber-like arcuate segments each have a fluted inner surface for engaging the corresponding portions of the first and second tubular members.

* * * * *